United States Patent
Mishra et al.

(10) Patent No.: US 12,216,306 B1
(45) Date of Patent: Feb. 4, 2025

(54) COMPUTING DEVICE WITH INTEGRATED BEZEL LIGHT

(71) Applicant: Intel Corporation, Santa Clara, CA (US)

(72) Inventors: Surya Pratap Mishra, Portland, OR (US); Shantanu Dattatraya Kulkarni, Hillsboro, OR (US); Min Suet Lim, Simpang Ampat (MY)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 18/397,148

(22) Filed: Dec. 27, 2023

(51) Int. Cl.
*F21V 8/00* (2006.01)
*G06F 1/16* (2006.01)
*H05B 47/11* (2020.01)

(52) U.S. Cl.
CPC ......... *G02B 6/0055* (2013.01); *G02B 6/0051* (2013.01); *G02B 6/0068* (2013.01); *G06F 1/1686* (2013.01); *H05B 47/11* (2020.01)

(58) Field of Classification Search
CPC .. G02B 6/0068; G02B 6/0055; G02B 6/0051; H05B 47/11; G06F 1/1686
See application file for complete search history.

(56) References Cited

U.S. PATENT DOCUMENTS

| | | | | |
|---|---|---|---|---|
| 11,191,341 | B2* | 12/2021 | Hamaoka | G06V 40/166 |
| 2014/0362602 | A1* | 12/2014 | Hofman | G02B 6/0073 |
| | | | | 362/611 |
| 2020/0336705 | A1* | 10/2020 | Mouizina | G09G 5/10 |

OTHER PUBLICATIONS

"Custom LED Light Panel", [Online]. Retrieved from the Internet: <https://www.maxillumination.com/custom-led-light-panel-p-5.html>, (Accessed on Sep. 9, 2024), 2 pages.

(Continued)

*Primary Examiner* — Mary Ellen Bowman
(74) *Attorney, Agent, or Firm* — Schwegman Lundberg & Woessner, P.A.

(57) ABSTRACT

An illuminated display screen bezel may provide improved user illumination when using a portable electronic device. The illuminated display screen bezel may include a series of LEDs built into the bezel, may include a light guide plate, or may include an extended display area at least partially covered by a controllable opaque layer. These lighting mechanisms may be dynamically controlled and adjusted with one or more smart control algorithms to suit different users. The improved image quality may be used to provide improved performance of image processing features, such as improving the ability of a videoconferencing program to create a virtual background or improving the ability of an AI system to perform image analysis. These lighting configurations may also be used for providing notification lights, automatic dimming based on detected ambient light, program-enhancing RGB lighting effects, mood lighting, and other lighting effects.

20 Claims, 10 Drawing Sheets

(56) References Cited

OTHER PUBLICATIONS

"Front Light Guides for E ink and other Reflective Displays for Day Night Operations", [Online]. Retrieved from the Internet: <https://www.planetechn.com/Lightguides/Front%20Light%20Guides.html>, (Accessed on Sep. 9, 2024), 2 pages.

"Tom's Guide", [Online]. Retrieved from the Internet: <https://www.tomsguide.com/news/the-wackiest-laptop-of-ces-2021-has-three-webcams-and-its-own-ring-light>, (Jan. 13, 2021), 13 pgs.

Seda, Dennis, "LED Ring Light for Laptop Screen", [Online]. Retrieved from the Internet: <https://www.instructables.com/LED-Ring-Light-for-Laptop-Screen/>, (Accessed on Sep. 9, 2024), 10 pages.

\* cited by examiner

COMPUTING DEVICE WITH INTEGRATED BEZEL LIGHT

BACKGROUND

One of the key factors that help with a good user experience during video conferencing applications is the appropriate level of lighting. Ambient lighting may not be sufficient to properly illuminate a user's face, such as when a user is in an environment with reduced ambient light. In these environments, the user may need to use additional light sources, such as computer-mounted ring lights or other such accessories.

Current form factors of ring lights include an external accessory that can be mounted on a stand or clipped onto a computing device. However, these ring lights must be transported with the electronic device and plugged in for each use. One solution includes a software display that increases the brightness of the display to create a software-based bright ring (e.g., all-white pixel area) or border on a portion of a user's display. However, these solutions have limited ability to provide additional lighting, and may significantly reduce the useable software display area by covering up a substantial portion of the visible display.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
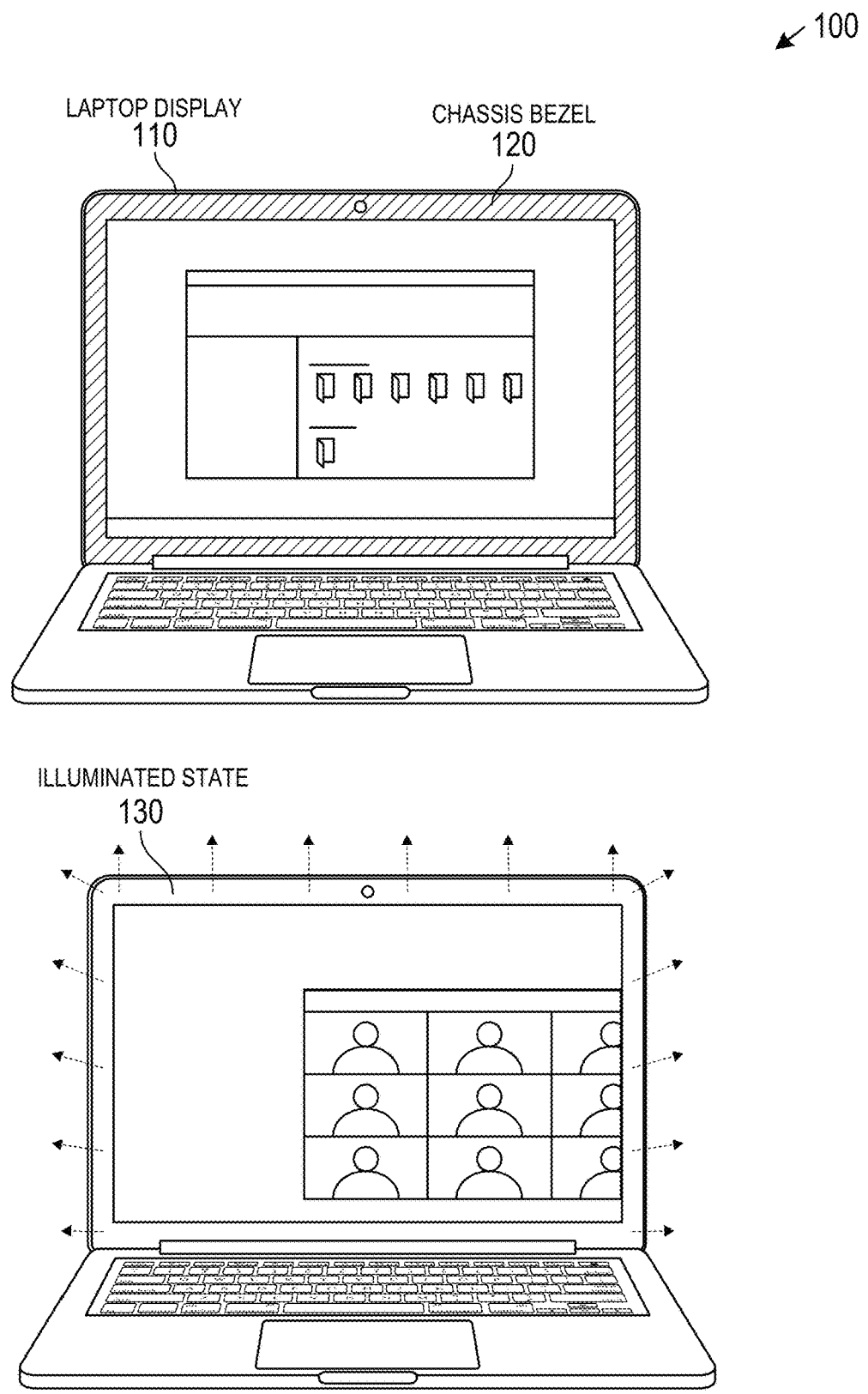
FIG. 1 is a block diagram illustrating a laptop, according to an embodiment.

To address technical User Experience (UX) problems facing the use of a portable electronic device (e.g., notebook, laptop, tablet, smartphone), an illuminated display screen bezel (e.g., integrated bezel light) may provide improved user illumination. The illuminated display screen bezel may include a series of LEDs built into the bezel, may include a light guide plate, or may include an extended display area at least partially covered by a controllable opaque layer. These lighting mechanisms may be dynamically controlled and adjusted with one or more smart control algorithms to suit different users.

These lighting configurations for improved electronic device lighting provide several technical benefits. These include improved user experiences for video conferencing, video content creation, and similar usages for end-users, reduced UX complexity for the end-user; and improved image quality. The improved image quality may be used to provide improved performance of image processing features, such as improving the ability of a videoconferencing program to identify a user (e.g., to separate the user programmatically from a virtual background) or improving the ability of an artificial intelligence (AI) system to perform image analysis. These lighting configurations may also be used for providing notification lights, automatic dimming based on detected ambient light, program-enhancing lighting effects (e.g., red-green-blue (RGB) lighting), mood lighting, and other lighting effects.

In an example, a light guide plate may be used to improve light distribution around a laptop display bezel. The light guide plate may be integrated into the laptop display bezel, which may be integrated while reducing or minimizing any increase in laptop display thickness. The light guide plate may be integrated into the laptop chassis in various combinations, such as integrated into the laptop bezel (e.g., B-cover), integrated into the topmost laptop cover (e.g., A-cover) and directed through the laptop bezel, integrated into the laptop keyboard cover (e.g., C-cover) and directed toward the user, integrated into a laptop case (e.g., laptop skin) that is attached to the laptop to provide additional protection and lighting, or a combination of laptop covers or cases. Also, usage of the term "laptop" is not limiting, and the technical solutions described herein may be applied to smartphones, standalone tablets, 2-in-1 convertible notebook-tablet devices, computer monitors, and other devices with electronic displays.

The use of a light guide plate may reduce a number of LEDs used to illuminate a user, and may reduce or eliminate the need to place multiple LEDs in various locations in the bezel. The light guide plate may use an LED or other light source on one end of the light plate, and may direct the light from the LED source to the bezel surface facing the user. In an example, the entire bezel may be implemented as a light guide plate. Because existing bezels typically include a plastic cover, the replacement of a plastic cover bezel with a light guide plate may provide improved lighting while reducing or minimizing any increase in laptop display thickness.

In the following description, for purposes of explanation, numerous specific details are set forth to provide a thorough understanding of some example embodiments. It will be evident, however, to one skilled in the art that the present disclosure may be practiced without these specific details.

FIG. 1 is a block diagram illustrating a laptop 100, according to an embodiment. Laptop 100 may include a laptop display 110 and a chassis bezel 120. The chassis bezel 120 is an integral part of the laptop's frame, typically surrounding the display portion of the laptop display 110.

The chassis bezel 120 may be adapted to provide illumination, such as through the inclusion of LEDs or the inclusion of a light guide plate. The chassis bezel 120 may adjust illumination characteristics such as intensity or tone (e.g., warm tone, neutral tone, cool tone), such as to match or enhance ambient or background colors on the laptop display 110. The chassis bezel 120 may transition from an unlit state to an illuminated state 130, enhancing the illumination of the user's face during activities such as video conferencing. The illumination state and illumination transitions may be controlled manually by a user or may be triggered automatically by the laptop based on application context (e.g., notifications generated by the application, a type or name of application in use), or detected ambient light conditions.

The use of the chassis bezel 120 to provide illumination provides improvements over traditional external ring lights or software-based lighting solutions. By integrating the lighting functionality directly into the chassis bezel 120, the laptop display 110 may reduce or minimize the use and configuration required for external ring lights and similar separate lighting accessories, such as the need to carry and setup an external ring light.

Figure 2:
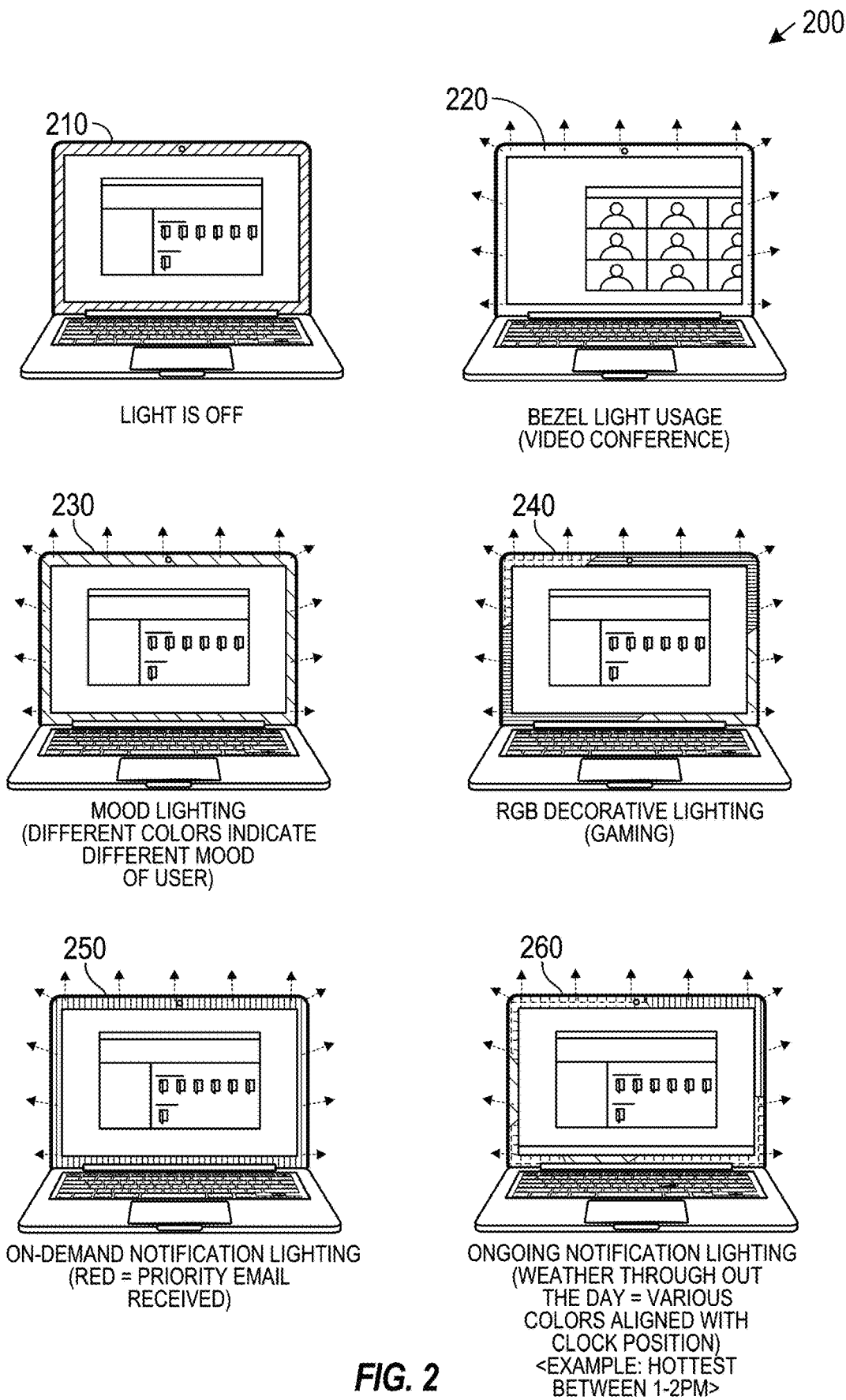
FIG. 2 is a block diagram illustrating integrated bezel light states, according to an embodiment.

FIG. 2 is a block diagram illustrating integrated bezel light states 200, according to an embodiment. The integrated bezel light states 200 demonstrate the integrated bezel light in various inactive and active states, as well as various states for different user scenarios.

In the inactive state 210, the integrated bezel light is not illuminated, indicating that the lighting feature is not in use. This state is typical when the computing device is being used for tasks that do not require additional lighting, such as general computing or when the device is in power-saving mode.

When the integrated bezel light is in the active state 220, the light illuminates the user's face, providing enhanced visibility and image quality during video calls. This is particularly beneficial in low-light environments where the built-in camera may struggle to capture a clear image.

The integrated bezel light also serves as mood lighting 230, where different colors can indicate the mood of the user. The mood lighting 230 may be set by a user or may be detected by the computing device, such as using a webcam on the system to detect a user's mood through a computer vision algorithm and display color based on mood. In some examples, a green light may be displayed when a happy mood is detected, an orange light may be displayed when a sad mood is detected, or a red light may be displayed when a scared mood is detected. The mood lighting 230 may be particularly useful for social interactions or as a non-intrusive way for parents to gauge the emotional state of their children during device use.

For gaming applications, the integrated bezel light can be used for RGB decorative lighting 240. This feature may add an aesthetic appeal and enhance gaming or movie-viewing experience, such as by using dynamic lighting effects that change in response to game events or emphasize an on-screen color scheme.

On-demand notification lighting 250 may be used to display different colors to indicate various types of on-demand system notifications. The notification lighting 250 may include a brief flash, a pulse, or a noticeable color change. The notification lighting 250 may include or be responsive to receiving e-mails, instant messages, calendar reminders, or other on-demand notifications.

Ongoing notification lighting 260 may be used to provide less intrusive status updates. These ongoing notification lighting 260 may include a battery life notification, such as green to indicate enough battery remains and red to indicate low battery life. These ongoing notification lighting 260 may include weather updates, such as red lighting to indicate hot times during the day. These ongoing notification lighting 260 may also include different colors or different lighting positions to indicate time of day or time left on a countdown timer. The lighting positions may be implemented using a light guide plate or a series of LEDs, such as LEDs shown in FIG. 3.

Figure 3:
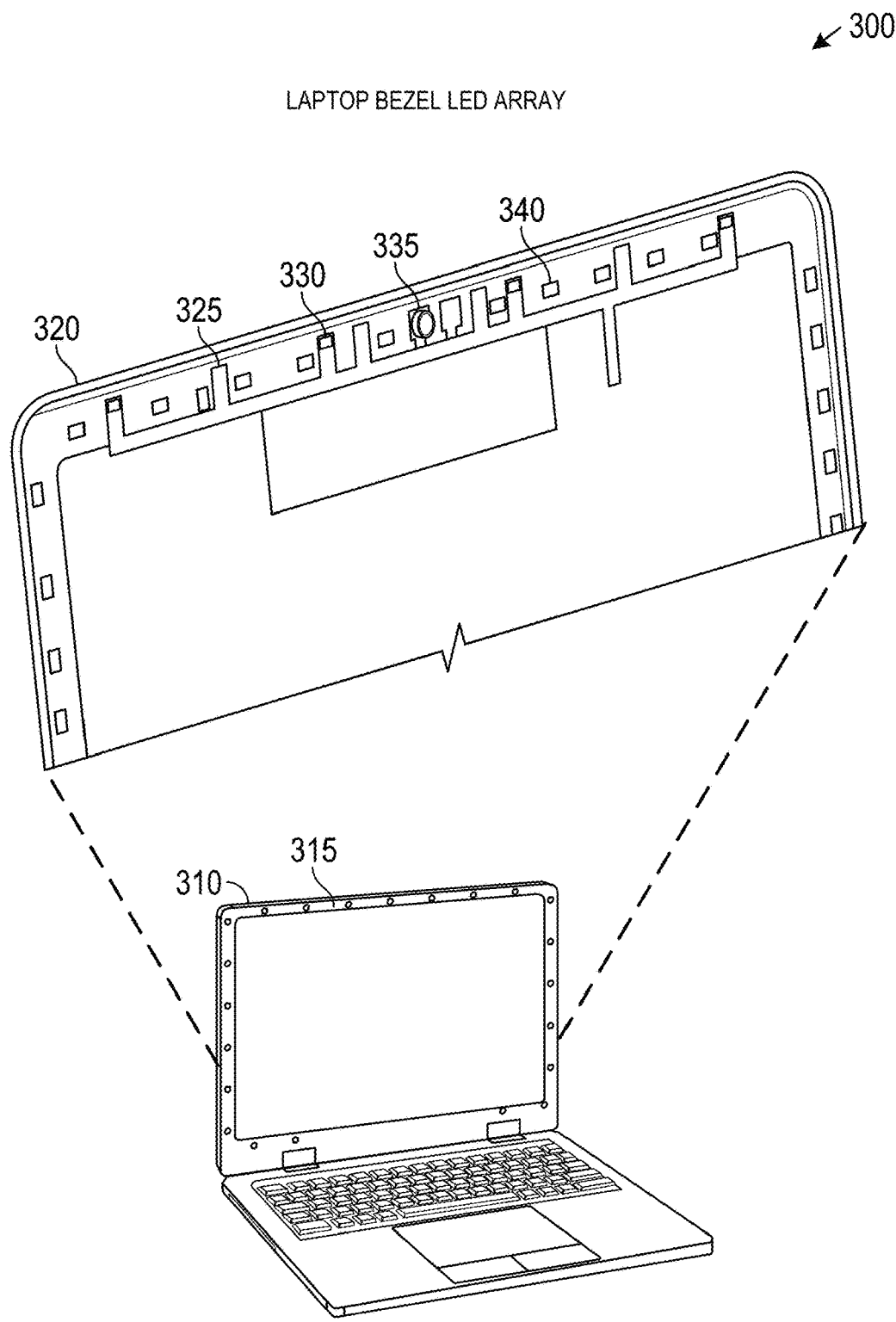
FIG. 3 is a block diagram illustrating a laptop bezel LED array, according to an embodiment.

FIG. 3 is a block diagram illustrating a laptop bezel LED array 300, according to an embodiment. The laptop shown in FIG. 3 includes a display 310 with a bezel 315 (B-cover) with integrated LED lighting. The display may include a back cover 320 (A-cover) that supports integrated LED lighting and associated circuitry, such as a rigid or flexible printed circuit board (PCB) 325. The PCB 325 may support connections to surface-mount LEDs 330 or an integrated camera 335. The back cover 320 may also support separate LEDs 340 that are not on the PCB 325. The LEDs may include low-profile LEDs, miniature LEDs, an LED light strip, or other LEDs that fit within the bezel 315.

The multiple LEDs within the laptop bezel LED array 300 may be positioned to provide improved light distribution (e.g., even lighting) across the surface of the bezel 315. Each of surface-mount LEDs 330 or the separate LEDs 340 may be controllable (e.g., addressable) individually, as one large group, or in subgroups. In an example, a line of separate LEDs 340 may be individually addressable, and may provide a progress bar indication. The LEDs may also include controllable lighting features, such as controllable colors, color temperature, illumination intensity, and other controllable lighting features.

The laptop bezel LED array 300 may be designed to reduce or minimize the appearance of LEDs. For example, though bezel 315 is shown with circles indicating LED positions, the LEDs may be covered by a circular lens that blends in with the color of the bezel 315, or the entire bezel 315 may be formed from a light-transmissive and light-diffusive material that obscures LED locations and provides improved light diffusion.

Figure 4:
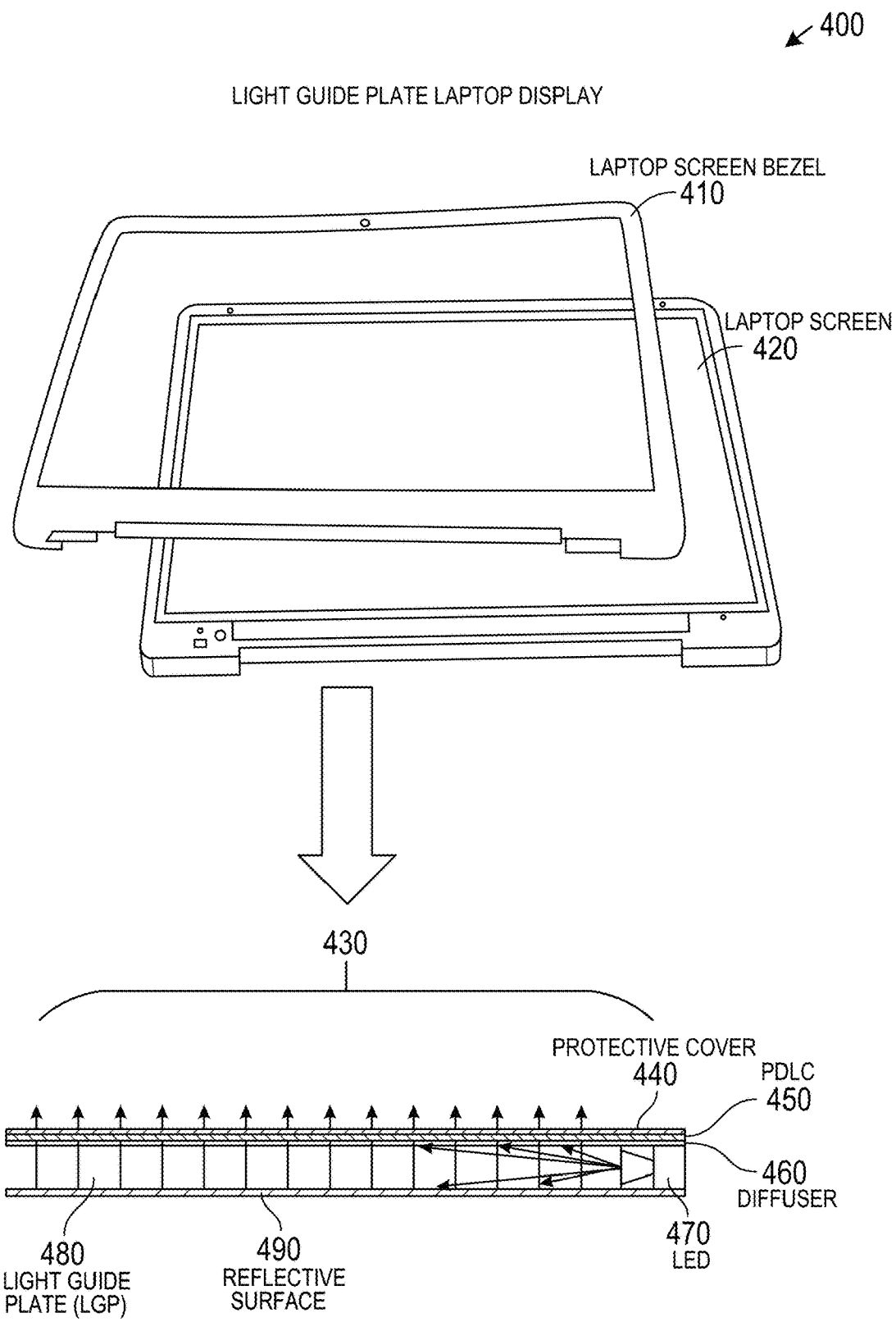
FIG. 4 is a block diagram illustrating a light guide plate laptop display, according to an embodiment.

FIG. 4 is a block diagram illustrating a light guide plate laptop display 400, according to an embodiment. The light guide plate laptop display 400 may include a laptop screen bezel 410 configured to be attached to the front of a laptop screen 420. The laptop screen bezel 410 may include multiple layers and components, such as the cross-section view 430 shown in FIG. 4.

As shown in the cross-section view 430, the outer layer (e.g., user-facing layer) of the laptop screen bezel 410 may include a protective cover 440. The protective cover 440 is placed over the polymer dispersed liquid crystal (PDLC) layer 450 and other layers for protection against external elements and potential damage. This protective cover 440 may be transparent or light-transmissive, which may allow light to pass through the protective cover 440 when the integrated bezel light is activated.

Below the protective cover 440 is a PDLC layer 450. The PDLC layer 450 may be electronically activated to transition between opaque and substantially transparent. This PDLC layer 450 may be used to attenuate or substantially block light emitted by the laptop screen bezel 410. The PDLC layer 450 may also be used to obscure or hide electronic components within the laptop screen bezel 410, such as when the laptop screen bezel 410 is not emitting light.

Below the PDLC layer 450 is a light diffuser 460. The light diffuser 460 may be used to improve the dispersion of light provided by the laptop screen bezel 410, such as to provide more even lighting or provide a softer lighting glow. The use of a light diffuser 460 may reduce or minimize the directionality of lighting, which may further improve the appearance of the user during a video conference.

Below the light diffuser 460 is an LED 470. The LED source 470 may include a single LED, multiple LEDs, an LED bar, or other LED configuration. The LED source 470 may provide a light source into a light guide plate (LGP) 480, and the LGP 480 may channel light throughout its length, such as using internal reflection properties to propagate light away from the LED source 470 throughout the LGP 480. The LGP 480 may also be configured to allow light to pass substantially perpendicularly, which may be used to direct light toward the light diffuser 460 and toward the user. A reflective surface reflective surface 490 may also be used to improve light propagation along the LGP 480 and improve directing light toward the light diffuser 460 and toward the user.

Figure 5:
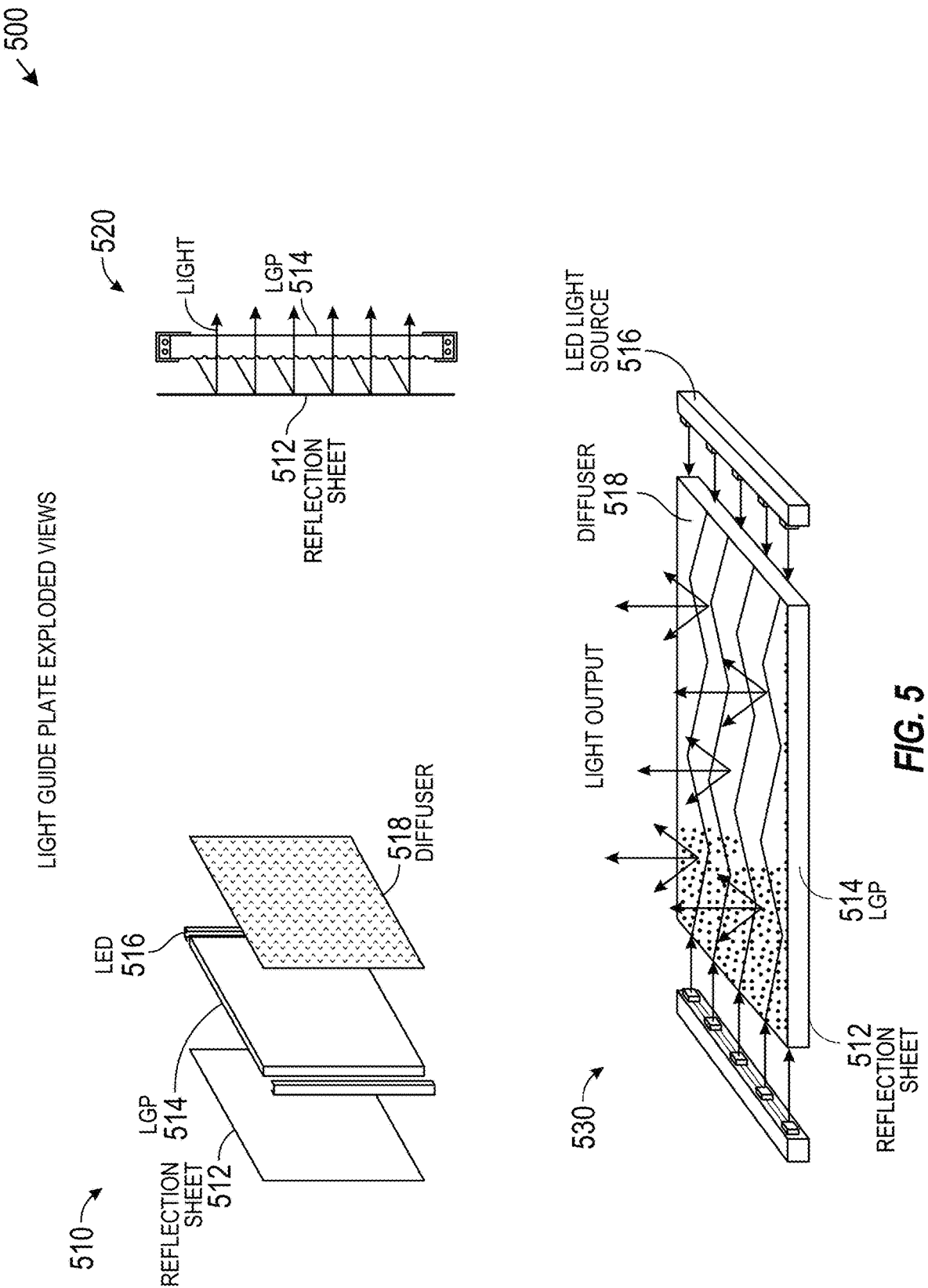
FIG. 5 is a block diagram illustrating light guide plate exploded views, according to an embodiment.

FIG. 5 is a block diagram illustrating light guide plate exploded views 500, according to an embodiment. As shown in the first exploded view 510, an LGP 514 is disposed between a reflection sheet 512 and a diffuser 518. The light source for the LGP 514 is provided by LEDs 516 that emit light that enters the LGP 514. In the example first exploded view 510, two LEDs 516 are positioned on either side of LGP 514 to inject light into the LGP 514.

The second exploded view 520 emphasizes the functionality of the reflection sheet 512. The second exploded view 520 shows reflection sheet 512 placed behind the LGP 514 to reflect light back into and through the LGP 514. This may improve or maximize the amount of light emitted from the LGP 514, thereby improving the energy and illumination efficiency of the light guide plate.

The third exploded view 530 emphasizes the functionality of the diffuser 518. The LGP 514 is disposed between the reflection sheet 512 and the diffuser 518. The reflection sheet 512 aids in reflecting light towards the diffuser 518, which is on the user-facing side of the LGP 514. The diffuser 518 may be used to scatter light passing through the LGP 514, creating a soft and uniform lighting effect. In an example, the diffuser 518 may include diffuser particles that aid in light dispersion. The dispersed lighting provided by the diffuser 518 reduces or eliminates uneven lighting (e.g., bright spots) or glare that may be uncomfortable or unwanted in video applications.

Figure 6:
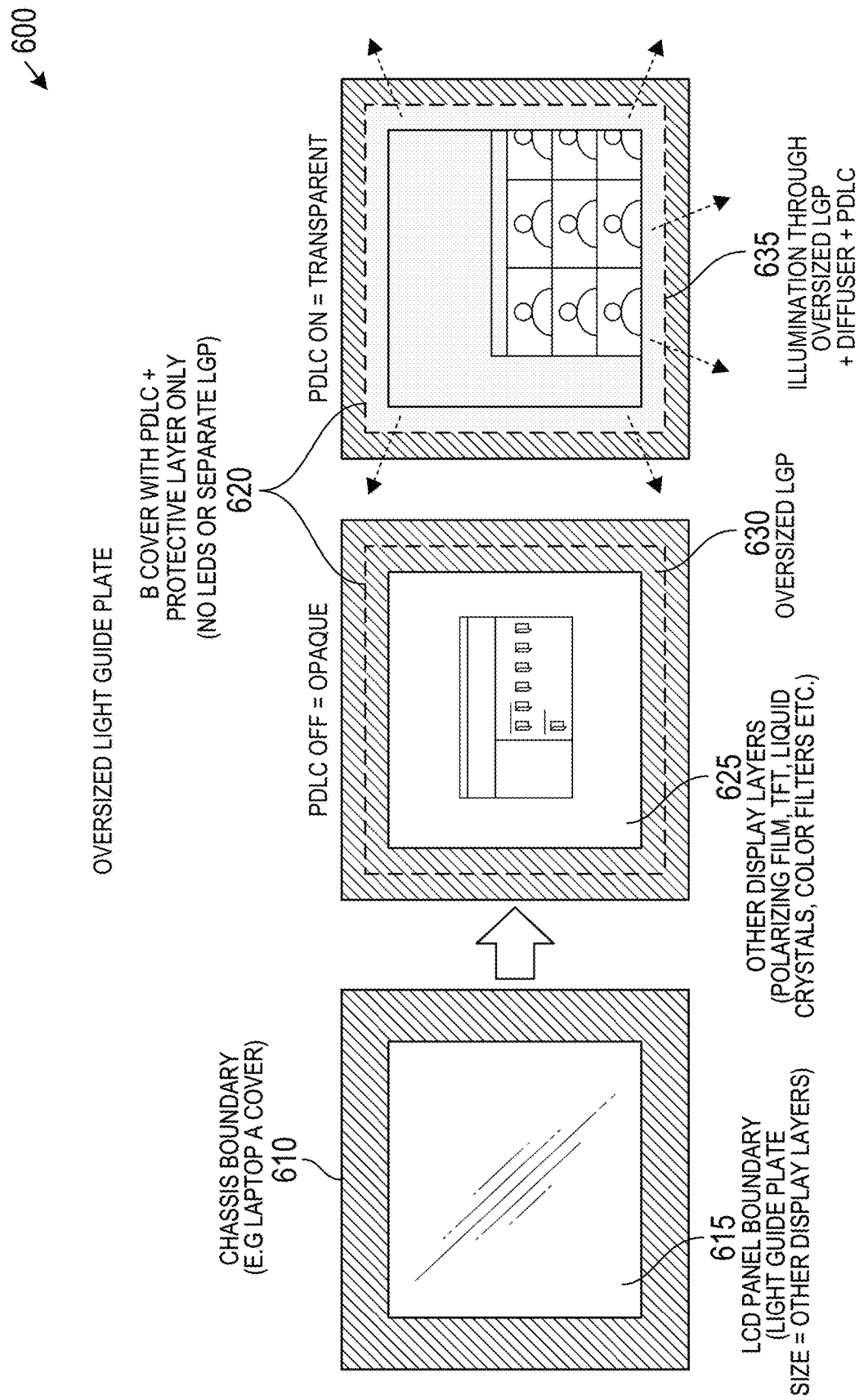
FIG. 6 is a block diagram illustrating an oversized light guide plate, according to an embodiment.

FIG. 6 is a block diagram illustrating an oversized light guide plate 600, according to an embodiment. The oversized light guide plate 600 shows example configurations in which one or more of the LGP and the diffuser layers are oversized compared to other display layers, such as other layers in a liquid crystal display (LCD) panel. This layer oversizing may be implemented along a display perimeter or on one or more sides of the display, where placement may depend on other chassis or system constraints (e.g., integrated webcam placement, cable routing).

The chassis boundary 610 may represent the outer frame of a laptop's A-cover, which defines the overall size and shape of the computing device display. Within this boundary, the LCD panel boundary 615 indicates the typical area occupied by standard display layers, such as liquid crystals, polarizing films, thin-film transistor TFT layers, color filters, or other display layers.

In contrast with the LCD panel boundary 615, an oversized display panel (e.g., oversized LGP and diffuser) may be used in conjunction with a PDLC to selectively display portions of the display panel that extend beyond a typical LCD panel boundary. The display panel may include display layers 625 in a smaller region and an oversized LGP 630.

A B-cover with PDLC and protective layer 620 may be used to control which regions of the oversized LGP 630 provide additional illumination. The B-cover with PDLC and protective layer 620 may not include LEDs or a separate LGP to provide light, but instead use selectively controlled opacity of the PDLC to expose or hide illuminated portions of the oversized LGP 630. When the PDLC is deactivated (e.g., in the OFF state), the region of the oversized LGP 630 is covered with an opaque region of the PDLC and appears dark. When the PDLC is activated (e.g., in the ON state), the region of the oversized LGP 630 is transparent and light shines from the oversized LGP 630 through the diffuser and PDLC. The oversized light guide plate 600 enables the integrated bezel light to provide illumination around the perimeter of the display layers 625 without increasing the display size requirements of the display layers 625. The oversized light guide plate 600 is particularly useful for display panels that have their own backlight and LGP and diffuser layers, such as LCD panel display devices.

Figure 7:
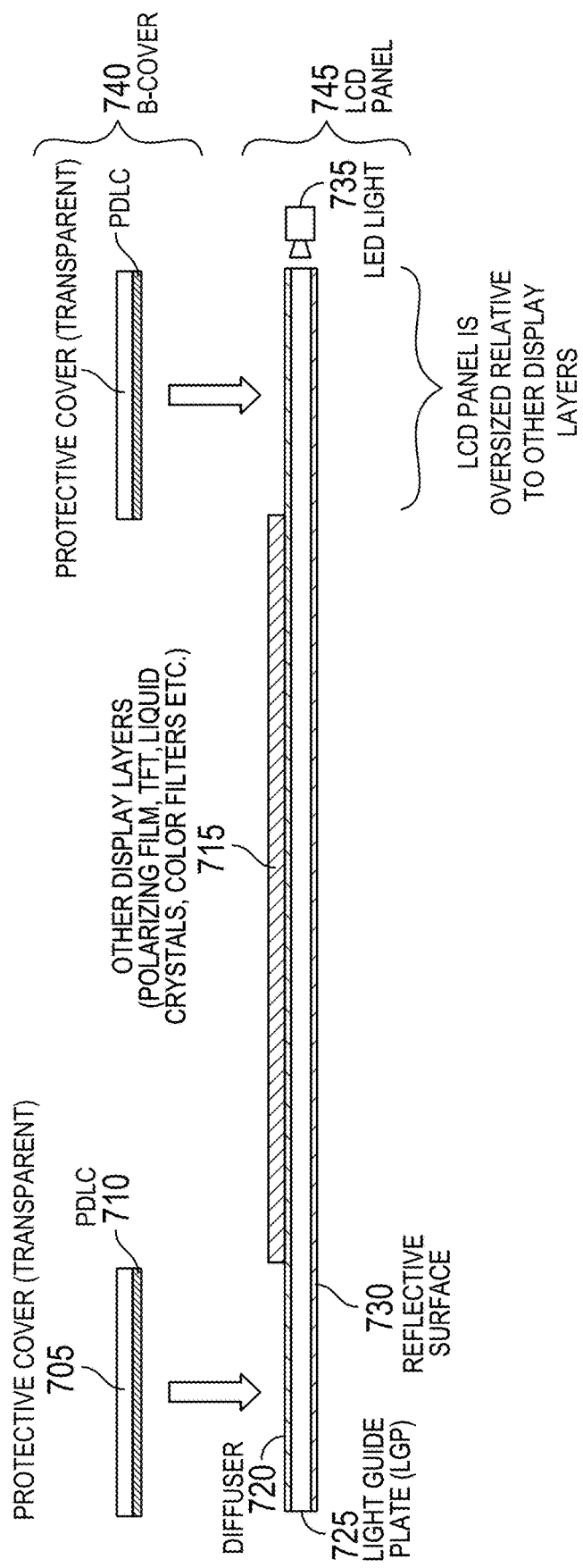
FIG. 7 is a block diagram illustrating an oversized light guide plate cross-section, according to an embodiment.

FIG. 7 is a block diagram illustrating an oversized light guide plate cross-section 700, according to an embodiment. The oversized light guide plate cross-section 700 shows a cross-sectional view of the oversized light guide plate 600 shown in FIG. 6.

The outermost layer shown is the protective cover 705, which may include a transparent or otherwise light-transmissive material to allow light to pass easily through to the user. The protective cover 705 provides physical protection for the underlying layers while allowing light to pass through unimpeded when the integrated bezel light is activated.

Beneath the protective cover 705 is the PDLC layer 710. The PDLC layer 710 may include an electronically activated film that can transition between an opaque state and a transparent state. In an example, when voltage is applied to the PDLC layer 710, the PDLC layer 710 becomes transparent or otherwise light-transmissive. Conversely, when the voltage is removed, the PDLC layer 710 reverts to an opaque state, reducing or eliminating light and concealing any electronic devices beneath the PDLC layer 710.

The protective cover 705 and the PDLC layer 710 may form a B-cover 740, which may be disposed around display layers 715. The display layers 715 may include polarizing films, TFT layers, liquid crystals, color filters, and other display layers used for display functionality of the LCD panel. While oversized light guide plate cross-section 700 shows two separate images of the protective cover 705 and the PDLC layer 710, the B-cover 740 may be formed into a rectangle surrounding the display layers 715, such as rectangular configuration of the protective layer 620 shown in FIG. 6.

The protective cover 705 and the PDLC layer 710 within the B-cover 740 may be disposed on an LCD panel 745. The B-cover 740 may be disposed on a diffuser 720, which serves to improve the uniformity of the light emitted from the LGP 725 (e.g., scatter and soften the light). The diffuser 720 improves light distribution, reducing or minimizing uneven lighting or glare that could be distracting or uncomfortable for the user. The LGP 725 is used to guide light from the light source 735 throughout the light guide plate LGP 725 and distribute light evenly across its surface, ensuring a consistent integrated bezel light effect. A reflective surface 730 may be disposed on the side of the LGP 725 opposite the diffuser 720. This reflective surface 730 enhances the light distribution by reflecting light back into the LGP 725, which is then redirected outwards through the diffuser 720.

While these implementations have been shown and described with respect to PDLC technology, other smart film technologies may be used to provide controlled transitions between substantially transparent states and opaque states.

Figure 8:
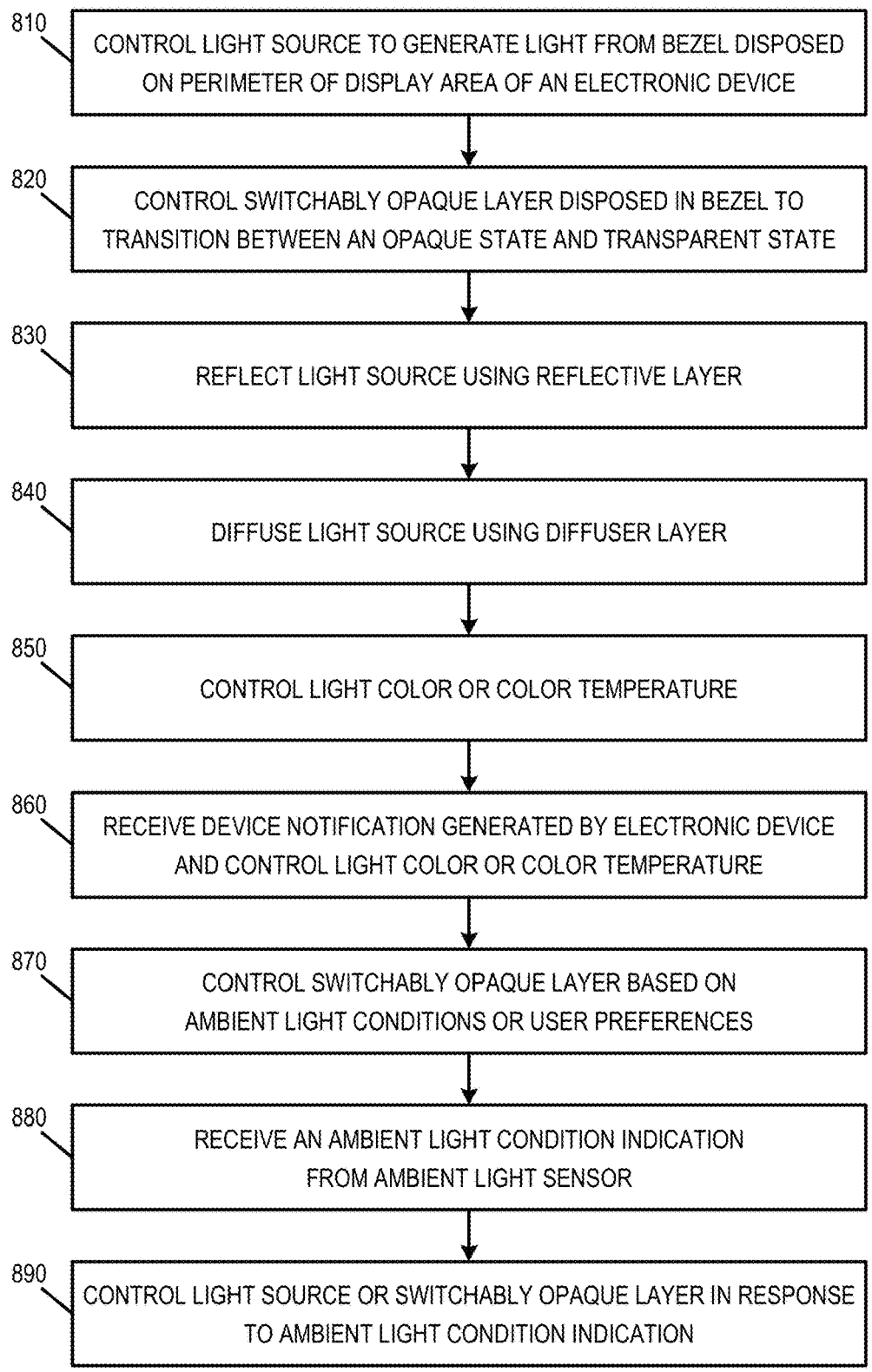
FIG. 8 is a flow diagram illustrating a method for illuminating an electronic device, according to an embodiment.

FIG. 8 is a flow diagram illustrating a method 800 for illuminating an electronic device, according to an embodiment. Method 800 includes controlling 810 a light source to generate light from a bezel disposed on a perimeter of a display area of an electronic device, where the light source is configured to illuminate a user viewing the display area. Method 800 includes controlling 820 a switchably opaque layer disposed in the bezel over the light source to transition between an opaque state and a transparent state to emit light from the light source.

The light source may include a plurality of light-emitting diodes disposed within the bezel. The light source may include a light guide plate configured to distribute light along the bezel and a light guide source positioned to emit light into the light guide plate. The switchably opaque layer may include a switchable PDLC layer. The light guide source may include a plurality of LEDs positioned around at least a portion of a light guide perimeter of the light guide plate.

Method 800 may further include reflecting 830 the light source using a reflective layer disposed on a first side of the light guide plate to enhance a distribution of light emitted by the light source. Method 800 may further include diffusing 840 the light source using a diffuser layer disposed on second side of the light guide plate opposite the reflective layer, wherein the reflective layer is configured to reflect light towards the diffuser layer. The switchably opaque layer may include a protective cover layer disposed over the switchably opaque layer to protect the switchably opaque layer from external elements.

Method 800 may further include controlling 850 at least one of a light color or a color temperature of the light source. Method 800 may further include receiving 860 a device notification generated by the electronic device, wherein controlling at least one of a light color or a color temperature of the light source is based on the device notification. The device notification may include an application-specific notification (e.g., a new e-mail notification), an indication of which application is currently in use, or other device notification. The light guide plate may be oversized relative to the display area to extend a distribution of light beyond an active display portion of the display area, such as the oversized light guide plate shown in FIG. 6 and FIG. 7.

Method 800 may further include controlling 870 the switchably opaque layer to transition between the opaque state and the transparent state based on at least one of ambient light conditions or user preferences. Method 800 further including receiving 880 an ambient light condition indication from an ambient light sensor. Method 800 may further include controlling 890 at least one of the light source or the switchably opaque layer in response to the ambient light condition indication.

Figure 9:
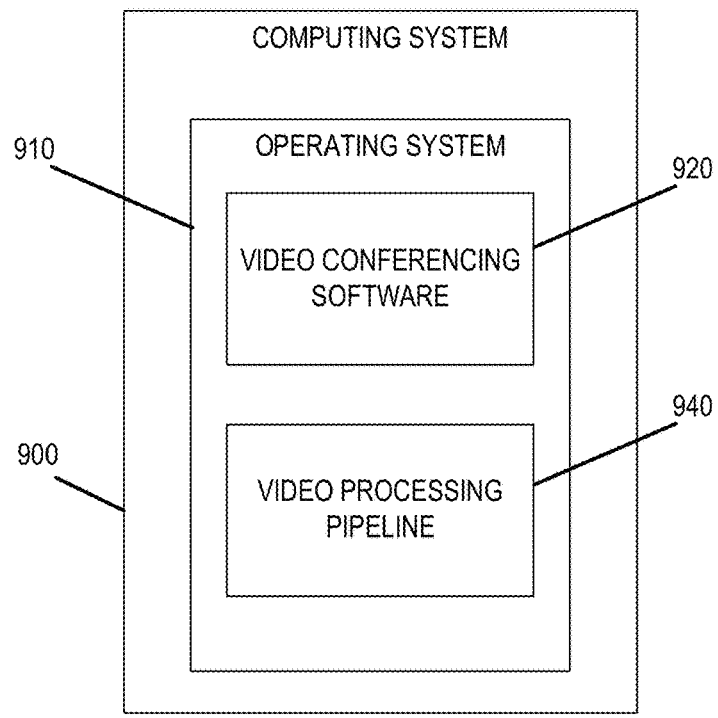
FIG. 9 is a block diagram illustrating a configuration of a computing system.

FIG. 9 is a block diagram illustrating a configuration of a computing system 900. As shown, the computing system 900 may include an operating system, video conferencing software, and video processing pipeline. The operating system, video conferencing software, and video processing pipeline may be used in connection with the lighting techniques discussed above.

Embodiments to implement the approaches above may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media (e.g., represented in portions of computer system 900 in FIG. 9, discussed below).

A processor subsystem (e.g., processor 1002 in FIG. 10, discussed below) may be used to execute the instruction on the computer-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in the present disclosure, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 10:
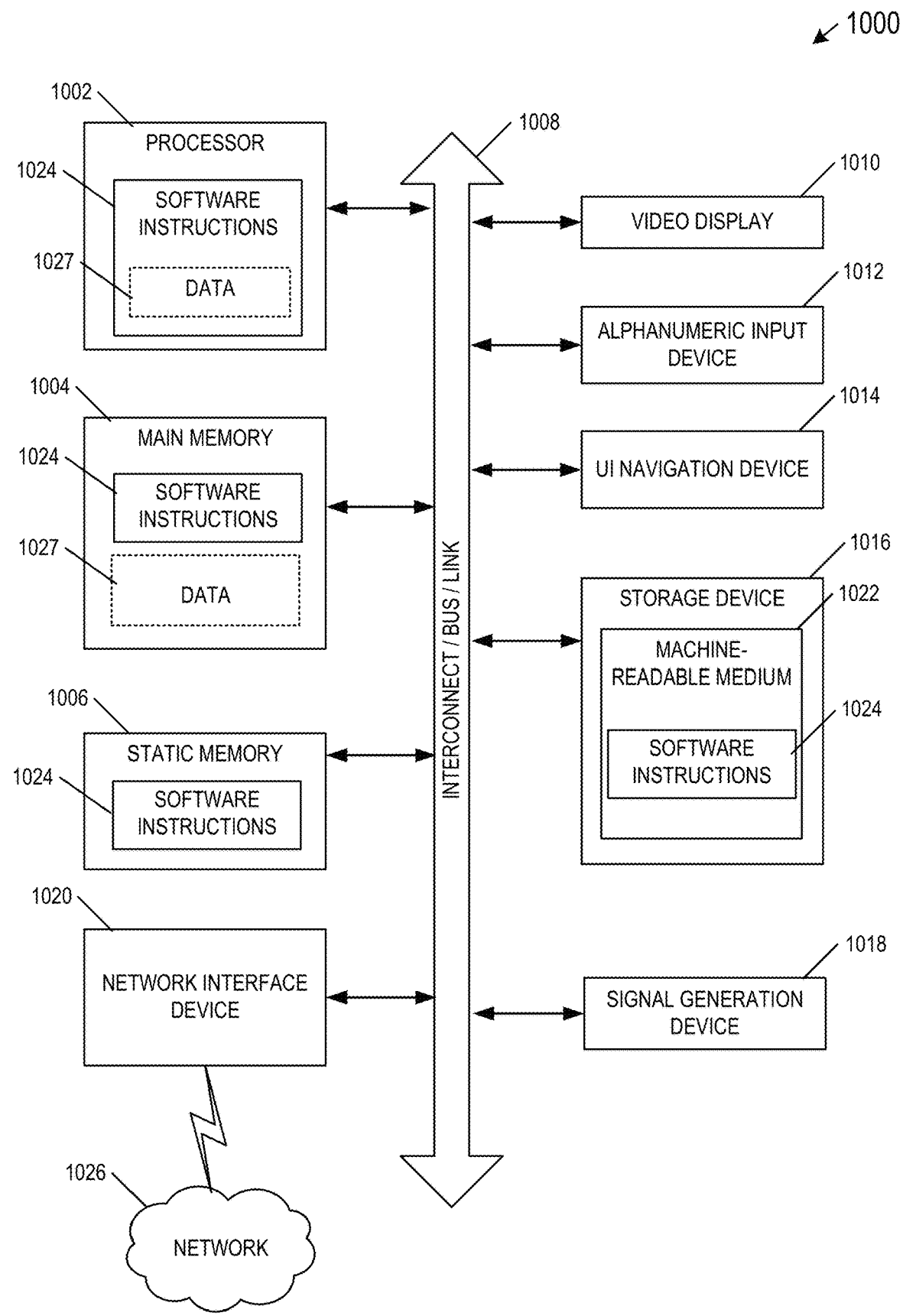
FIG. 10 is a block diagram illustrating a machine in the example form of a computer system, within which a set or sequence of instructions may be executed to cause the machine to perform any one of the methodologies discussed herein.

FIG. 10 is a block diagram illustrating a machine in the example form of a computer system 1000, within which a set or sequence of instructions may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., interconnect or bus). The computer system 1000 may further include a video display unit 1010, an alphanumeric input device 1012 (e.g., a keyboard), and a user interface (UI) navigation device 1014 (e.g., a mouse). In one aspect, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, mems gyroscope, magnetometer, or another location, motion, or orientation sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media. As an example, the software instructions 1024 may include instructions to implement and execute the segmentation operations via the processor (e.g., with software as configured and operated in the examples above). As a further example, the main memory 1004 (or the other memory or storage 1006, 1016) may host various data 1027 used with the video processing operations discussed herein.

While the machine-readable medium 1022 is illustrated in an example aspect to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is an electronic device comprising: a display screen, the display screen including a display area; a bezel disposed on a perimeter of the display area; a light source disposed within a portion of the bezel, the light source to emit light away from the display screen towards a user of the display screen; and a switchably opaque layer disposed over the light source, wherein the switchably opaque layer is operable to transition between an opaque state and a transparent state to selectively emit light from the light source.

In Example 2, the subject matter of Example 1 includes wherein the light source includes a plurality of light-emitting diodes disposed within the bezel.

In Example 3, the subject matter of Examples 1-2 includes wherein the light source includes: a light guide plate configured to distribute light along the bezel; and a light guide source positioned to emit light into the light guide plate.

In Example 4, the subject matter of Examples 1-3 includes wherein the switchably opaque layer includes a switchable Polymer Dispersed Liquid Crystal layer.

In Example 5, the subject matter of Examples 3-4 includes wherein the light guide source includes a plurality of light-emitting diodes positioned around at least a portion of a light guide perimeter of the light guide plate.

In Example 6, the subject matter of Examples 3-5 includes a reflective layer disposed on a first side of the light guide plate to reflect light emitted by the light source.

In Example 7, the subject matter of Example 6 includes a diffuser layer disposed on a second side of the light guide plate opposite the reflective layer, wherein the reflective layer is configured to reflect light towards the diffuser layer.

In Example 8, the subject matter of Examples 4-7 includes a protective cover layer disposed over the switchably opaque layer to protect the switchably opaque layer from external elements.

In Example 9, the subject matter of Examples 1-8 includes a light controller configured to control at least one of a light color or a color temperature of light emitted from the light source.

In Example 10, the subject matter of Example 9 includes wherein the light controller is configured to receive a device notification generated by the electronic device, and control at least one of the light color or the color temperature of light emitted from the light source based on the device notification.

In Example 11, the subject matter of Example 10 includes wherein the device notification includes at least one of an application-specific notification or a current application indication.

In Example 12, the subject matter of Examples 3-11 includes wherein the size of light guide plate is larger than the display screen to extend a distribution of light beyond an active display area of the display screen.

In Example 13, the subject matter of Examples 1-12 includes wherein the switchably opaque layer is electrically controllable to transition between an opaque state and a transparent state based on at least one of ambient light conditions or user preferences.

In Example 14, the subject matter of Examples 1-13 includes an ambient light sensor configured to generate an ambient light condition indication, wherein at least one of the light source or the switchably opaque layer is controlled in response to the ambient light condition indication.

Example 15 is a method for illuminating an electronic device, the method comprising: controlling a light source to generate light from a bezel disposed on a perimeter of a display area of an electronic device, the light source to emit light away from the display screen towards a user of the display screen; and controlling a switchably opaque layer disposed in the bezel over the light source to transition between an opaque state and a transparent state to emit light from the light source.

In Example 16, the subject matter of Example 15 includes wherein the light source includes a plurality of light-emitting diodes disposed within the bezel.

In Example 17, the subject matter of Examples 15-16 includes wherein the light source includes: a light guide plate configured to distribute light along the bezel; and a light guide source positioned to emit light into the light guide plate.

In Example 18, the subject matter of Examples 15-17 includes wherein the switchably opaque layer includes a switchable Polymer Dispersed Liquid Crystal layer.

In Example 19, the subject matter of Examples 17-18 includes wherein the light guide source includes a plurality of light-emitting diodes positioned around at least a portion of a light guide perimeter of the light guide plate.

In Example 20, the subject matter of Examples 17-19 includes reflecting the light source using a reflective layer disposed on a first side of the light guide plate to enhance a distribution of light emitted by the light source.

In Example 21, the subject matter of Example 20 includes diffusing the light source using a diffuser layer disposed on second side of the light guide plate opposite the reflective layer, wherein the reflective layer is configured to reflect light towards the diffuser layer.

In Example 22, the subject matter of Examples 15-21 includes wherein switchably opaque layer includes a protective cover layer disposed over the switchably opaque layer to protect the switchably opaque layer from external elements.

In Example 23, the subject matter of Examples 15-22 includes controlling at least one of a light color or a color temperature of light emitted from the light source.

In Example 24, the subject matter of Example 23 includes receiving a device notification generated by the electronic device, wherein controlling at least one of a light color or a color temperature of light emitted from the light source is based on the device notification.

In Example 25, the subject matter of Example 24 includes wherein the device notification includes at least one of an application-specific notification or a current application indication.

In Example 26, the subject matter of Examples 17-25 includes wherein the size of light guide plate is larger than the display area to extend a distribution of light beyond an active display portion of the display area.

In Example 27, the subject matter of Examples 15-26 includes controlling the switchably opaque layer to transition between the opaque state and the transparent state based on at least one of ambient light conditions or user preferences.

In Example 28, the subject matter of Examples 15-27 includes receiving an ambient light condition indication from an ambient light sensor; and controlling at least one of the light source or the switchably opaque layer in response to the ambient light condition indication.

Example 29 is a machine-readable storage medium comprising instructions that, when executed by processing circuitry of an electronic device, cause the processing circuitry to: control a light source to generate light from a bezel disposed on a perimeter of a display area of an electronic device, the light source to emit light away from the bezel towards a user of the display area; and control a switchably opaque layer disposed in the bezel over the light source to transition between an opaque state and a transparent state to emit light from the light source.

In Example 30, the subject matter of Example 29 includes wherein the light source includes a plurality of light-emitting diodes disposed within the bezel.

In Example 31, the subject matter of Examples 29-30 includes wherein the light source includes: a light guide plate configured to distribute light along the bezel; and a light guide source positioned to emit light into the light guide plate.

In Example 32, the subject matter of Examples 29-31 includes wherein the switchably opaque layer includes a switchable Polymer Dispersed Liquid Crystal layer.

In Example 33, the subject matter of Examples 31-32 includes wherein the light guide source includes a plurality of light-emitting diodes positioned around at least a portion of a light guide perimeter of the light guide plate.

In Example 34, the subject matter of Examples 31-33 includes the instructions further causing the processing circuitry to reflect the light source using a reflective layer disposed on a first side of the light guide plate to enhance a distribution of light emitted by the light source.

In Example 35, the subject matter of Example 34 includes the instructions further causing the processing circuitry to diffuse the light source using a diffuser layer disposed on second side of the light guide plate opposite the reflective layer, wherein the reflective layer is configured to reflect light towards the diffuser layer.

In Example 36, the subject matter of Examples 29-35 includes wherein switchably opaque layer includes a protective cover layer disposed over the switchably opaque layer to protect the switchably opaque layer from external elements.

In Example 37, the subject matter of Examples 29-36 includes the instructions further causing the processing circuitry to control at least one of a light color or a color temperature of light emitted from the light source.

In Example 38, the subject matter of Example 37 includes the instructions further causing the processing circuitry to receive a device notification generated by the electronic device, wherein controlling at least one of a light color or a color temperature of light emitted from the light source is based on the device notification.

In Example 39, the subject matter of Example 38 includes wherein the device notification includes at least one of an application-specific notification or a current application indication.

In Example 40, the subject matter of Examples 31-39 includes wherein the size of light guide plate is larger than the display area to extend a distribution of light beyond an active display portion of the display area.

In Example 41, the subject matter of Examples 29-40 includes the instructions further causing the processing circuitry to control the switchably opaque layer to transition between the opaque state and the transparent state based on at least one of ambient light conditions or user preferences.

In Example 42, the subject matter of Examples 29-41 includes the instructions further causing the processing circuitry to: receiving an ambient light condition indication from an ambient light sensor; and controlling at least one of the light source or the switchably opaque layer in response to the ambient light condition indication.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. An electronic device comprising:
    a display screen, the display screen including a display area;
    a bezel disposed on a perimeter of the display area;
    a light source disposed within a portion of the bezel, the light source to emit light away from the display screen towards a user of the display screen; and
    a switchably opaque layer disposed over the light source, wherein the switchably opaque layer is operable to transition between an opaque state and a transparent state to selectively emit light from the light source.

2. The electronic device of claim 1, wherein the light source includes a plurality of light-emitting diodes disposed within the bezel.

3. The electronic device of claim 1, wherein the light source includes:

a light guide plate configured to distribute light along the bezel; and a light guide source positioned to emit light into the light guide plate.

4. The electronic device of claim 3, wherein the light guide source includes a plurality of light-emitting diodes positioned around at least a portion of a light guide perimeter of the light guide plate.

5. The electronic device of claim 3, further including a reflective layer disposed on a first side of the light guide plate to reflect light emitted by the light source.

6. The electronic device of claim 5, further including a diffuser layer disposed on a second side of the light guide plate opposite the reflective layer, wherein the reflective layer is configured to reflect light towards the diffuser layer.

7. The electronic device of claim 1, further including a light controller configured to control at least one of a light color or a color temperature of light emitted from the light source.

8. The electronic device of claim 7, wherein the light controller is configured to receive a device notification generated by the electronic device, and control at least one of the light color or the color temperature of light emitted from the light source based on the device notification.

9. The electronic device of claim 8, wherein the device notification includes at least one of an application-specific notification or a current application indication.

10. The electronic device of claim 3, wherein the size of light guide plate is larger than the display screen to extend a distribution of light beyond an active display area of the display screen.

11. The electronic device of claim 1, further including an ambient light sensor configured to generate an ambient light condition indication, wherein at least one of the light source or the switchably opaque layer is controlled in response to the ambient light condition indication.

12. A machine-readable storage medium comprising instructions that, when executed by processing circuitry of an electronic device, cause the processing circuitry to:

control a light source to generate light from a bezel disposed on a perimeter of a display area of an electronic device, the light source to emit light away from the bezel towards a user of the display area; and control a switchably opaque layer disposed in the bezel over the light source to transition between an opaque state and a transparent state to emit light from the light source.

13. The machine-readable storage medium of claim 12, wherein the light source includes a plurality of light-emitting diodes disposed within the bezel.

14. The machine-readable storage medium of claim 12, wherein the light source includes:

a light guide plate configured to distribute light along the bezel; and a light guide source positioned to emit light into the light guide plate.

15. The machine-readable storage medium of claim 14, wherein the light guide source includes a plurality of light-emitting diodes positioned around at least a portion of a light guide perimeter of the light guide plate.

16. The machine-readable storage medium of claim 12, the instructions further causing the processing circuitry to control at least one of a light color or a color temperature of light emitted from the light source.

17. The machine-readable storage medium of claim 16, the instructions further causing the processing circuitry to receive a device notification generated by the electronic device, wherein controlling at least one of a light color or a color temperature of light emitted from the light source is based on the device notification.

18. The machine-readable storage medium of claim 14, wherein the size of light guide plate is larger than the display area to extend a distribution of light beyond an active display portion of the display area.

19. The machine-readable storage medium of claim 12, the instructions further causing the processing circuitry to control the switchably opaque layer to transition between the opaque state and the transparent state based on at least one of ambient light conditions or user preferences.

20. The machine-readable storage medium of claim 12, the instructions further causing the processing circuitry to:

receiving an ambient light condition indication from an ambient light sensor; and controlling at least one of the light source or the switchably opaque layer in response to the ambient light condition indication.

* * * * *